United States Patent [19]
Hall et al.

[11] Patent Number: 5,483,143
[45] Date of Patent: Jan. 9, 1996

[54] COMPOSITE CORE DESIGNED FOR INDUCTIVE COUPLED TRANSFORMER PROBES

[75] Inventors: John T. Hall, Woodland Hills; William Quon, Alhambra; Herbert J. Tanzer, Topanga, all of Calif.

[73] Assignee: Hughes Aircraft Company, Los Angeles, Calif.

[21] Appl. No.: 237,495

[22] Filed: Apr. 29, 1994

[51] Int. Cl.$^6$ .......................... H01M 10/46; H01F 27/02
[52] U.S. Cl. .......................... 320/2; 336/83; 336/DIG. 2
[58] Field of Search .................. 320/2; 336/59, 336/60, 61, 82, 83, 179, DIG. 2

[56] References Cited

U.S. PATENT DOCUMENTS

| | | | |
|---|---|---|---|
| 5,341,083 | 8/1994 | Klontz et al. | 320/2 |
| 5,408,209 | 4/1995 | Tanzer et al. | 336/60 X |
| 5,412,304 | 5/1995 | Abbott | 320/2 |
| 5,434,493 | 7/1995 | Woody et al. | 320/2 |

*Primary Examiner*—Peter S. Wong
*Assistant Examiner*—Edward Tso
*Attorney, Agent, or Firm*—Leonard A. Alkov; W. K. Denson-Low

[57] ABSTRACT

An inductive charge probe having a composite magnetic core for use in inductive battery charging apparatus for charging a battery. The charge probe is insertable into a charge port of the battery charging apparatus that is coupled to the battery. The charge probe comprises the composite magnetic core and a primary winding. The composite magnetic core includes first and second magnetic core halves comprising a high loss magnetic material that are disposed adjacent to each other and that contact each other at predetermined surfaces. First and second thermally conducting members are disposed through the first and second magnetic core halves and a gap is formed between adjacent proximal ends thereof. First and second magnetic center posts comprising low loss magnetic material abut the first and second magnetic core halves. The first and second thermal conducting members are disposed through the first and second magnetic core halves and center posts, respectively. The thermal conducting members are coupled to external heat exchangers. A gap is formed between adjacent proximal ends of the thermal conducting members and the magnetic center posts. The heat exchangers are thermally secured to peripheries of the respective magnetic center posts, and adjacent surfaces thereof are separated from each other. First and second insulators are disposed between the heat exchangers and the magnetic core halves. A magnetic disk comprising low loss magnetic material is disposed between the first and second magnetic center posts and thermally conducting members. The primary winding disposed around the magnetic disk.

7 Claims, 2 Drawing Sheets

COMPOSITE CORE DESIGNED FOR INDUCTIVE COUPLED TRANSFORMER PROBES

BACKGROUND

The present invention relates to inductive battery chargers, and more particularly, to a composite core that controls the temperature of an inductively coupled charge probe used to charge the propulsion batteries of electric vehicles.

The assignee of the present invention designs, develops and manufactures inductive charging systems for use in charging electric batteries of electric vehicles, and the like. The charging system employs a charge port comprising secondary windings and core that form a secondary of a transformer installed in the electric vehicle, and a charge coupler or probe comprising a primary winding and a core that form a primary of a transformer that is coupled to a power source and which is inserted into the charge port to charge the vehicle batteries. Charging of the batteries is done at high frequency and at high charging rates. Consequently, there is a great deal of heat buildup in the charge probe. The probe must be removed from the charge port by a user once charging is completed, and the temperature of the probe is a concern.

Four different approaches may be used to implement thermal management of inductive charge coupler port temperatures. The first approach is to rely on conduction of heat from the primary winding and core across an air gap interface to on-board heat exchangers having cooling air circulated by charge port fans. This approach works for systems operating from about 6 kw to 10 kw charging rates. The second approach is to route chilled air from off-board refrigeration unit through the coupler. This approach works for systems operating at charge rates from about 20 kw to 25 kw.

The third approach is to use a plastic heat exchanger that does not interact with the magnetic fields produced by the charging system. However, this approach has poor thermal transfer characteristics. The fourth approach is to use a metallic heat exchanger, that interacts with the magnetic field, resulting in a degree of proximity losses, depending on its location in the winding.

A discussion of metallic heat exchangers may be found in U.S. patent application Ser. No. 08/237,493, filed Apr. 27, 1994, entitled "Liquid Cooled Metallic, Inductive Probe for High Power Charging", assigned to the assignee of the present invention, which describes how to cool a winding of an inductive probe with a liquid fed plastic bladder, and how to interface a liquid fed metallic heat exchanger in a winding of an inductive probe, such that there is no interacting with the magnetic fields. U.S. patent application Ser. No. 08/237,494, filed Apr. 29, 1994, entitled "High Frequency Transformer Winding Having an Internally Liquid Cooled Winding", assigned to the assignee of the present invention, describes how to interface a liquid fed metallic heat exchanger in the winding of an inductive probe, and integrate this as a turn of the transformer winding such that there is no interaction of the heat exchanger with the magnetic fields. U.S. patent application Ser. No. 08/237,495, filed Apr. 29, 1994, entitled "Method of Cooling of Inductive Charge Magnetics Using Internal Heat Pipes", assigned to the assignee of the present invention, describes how to cool a winding of a charge port with a heat pipe. U.S. patent application Ser. No. 08/146,690, filed Nov. 2, 1993, entitled "Ducted Air-Cooled Secondary of Automotive Battery Charging Transformer", assigned to the assignee of the present invention, describes how to cool a winding of a charge port with a ducted air-cooled heat exchanger. The disadvantage of this approach is that the air cooled heat exchanger is not an integrated turn, that is, it only serves as a heat exchanger.

Therefore, it is an objective of the present invention to provide for a high power inductive battery charging apparatus employing a charge probe having an improved composite magnetic core. It is a further objective of the present invention to provide for a composite core that controls the temperature of an inductively coupled charge probe used in inductive battery charging apparatus to charge the propulsion batteries of electric vehicles.

SUMMARY OF THE INVENTION

In order to meet the above and other objectives, the present invention comprises an improved inductive charge probe for use in inductive battery charging apparatus used to charge a battery. The apparatus comprises a charge probe that is insertable into a charge port that is coupled to the battery. The charge probe comprises a housing, a primary magnetic core disposed in the housing, and a primary winding disposed around the primary magnetic core. The primary magnetic core is a composite magnetic core that embodies the principles of the present invention that provides for temperature control of the charge probe.

The primary magnetic core, or composite core, includes first and second magnetic core halves comprising high loss magnetic material that are disposed adjacent to each other. The first and second magnetic core halves are generally rectangular and have C-shaped cross sections. The first and second magnetic core halves contact each other at predetermined surfaces. First and second magnetic center posts comprising low loss magnetic material abut the first and second magnetic core halves. First and second thermal conducting members, or pins, are disposed through the first and second magnetic core halves and center posts, respectively. The thermal conducting members are coupled to external heat exchangers. A gap is formed between adjacent proximal ends of the thermal conducting members and the magnetic center posts.

First and second heat exchangers are thermally secured to peripheries of the first and second magnetic center posts, and adjacent surfaces thereof are separated from each other. First and second insulators are disposed between the respective heat exchangers and magnetic core halves. A magnetic disk or "puck" comprising low loss magnetic material is disposed in the gap between the magnetic center posts and thermal conducting members. A primary winding is disposed around the magnetic disk.

The present invention provides for a composite magnetic core that thermally controls the temperature of the magnetic disk or puck at the center of the inductively coupled charge probe. The present invention minimizes the temperature of the magnetic disk, while allowing greater power dissipation and temperature control of the primary magnetic core.

The present invention permits the design of a very high power density, high power, high frequency inductively coupled transformer. In the present invention, the primary magnetic core in the probe is cooled to between touch temperatures of 60° to 70° C. This requires that the heat loss from the primary magnetic core and the cooling of the primary magnetic core must be adequate to reach this temperature. This problem has been previously solved by using very expensive low loss ferrite core material coupled with air or water cooling.

The present invention greatly minimizes this problem by applying "localized dissipation and thermal control" to the primary magnetic core. This is achieved by using a very low loss ferrite material for the thermal conducting members and ferrite disk in the probe, and using a high loss ferrite material for the remaining portions of the magnetic disk. The thermal conducting members are thermally bonded to an air heat exchanger. The thermal conducting members are inserted into a hole through the magnetic core halves and center posts. The hole is filled with a thermally conductive material that conducts heat to the heat exchanger. Thus, the heat of the thermal conducting members are minimized by conducting the heat away from the outer surface and inside surface of the probe. Heat dissipation in the ferrite disk is minimized due to the use of low loss ferrite material, and is maintained at approximately the temperature of the magnetic center posts.

The present invention may be used in inductive battery charging apparatus employed for rapid, high rate charging of propulsion batteries of electric vehicles. Specifically, the present invention is adapted for use with an inductive charge coupler which, during charging, is inserted into a port on board an electric vehicle.

The present invention may be used in any transformer design but is specifically designed for use with inductive coupled transformer probes for charging the propulsion batteries of electric vehicles. The thermal limitations are particularly bad for electric vehicle induction coupled battery charging apparatus, such as where the inductive charge coupler is designed to be physically inserted into a secondary charge port disposed in the electric vehicle, since good thermal contact between the primary and secondary transformer cores is hard to achieve.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
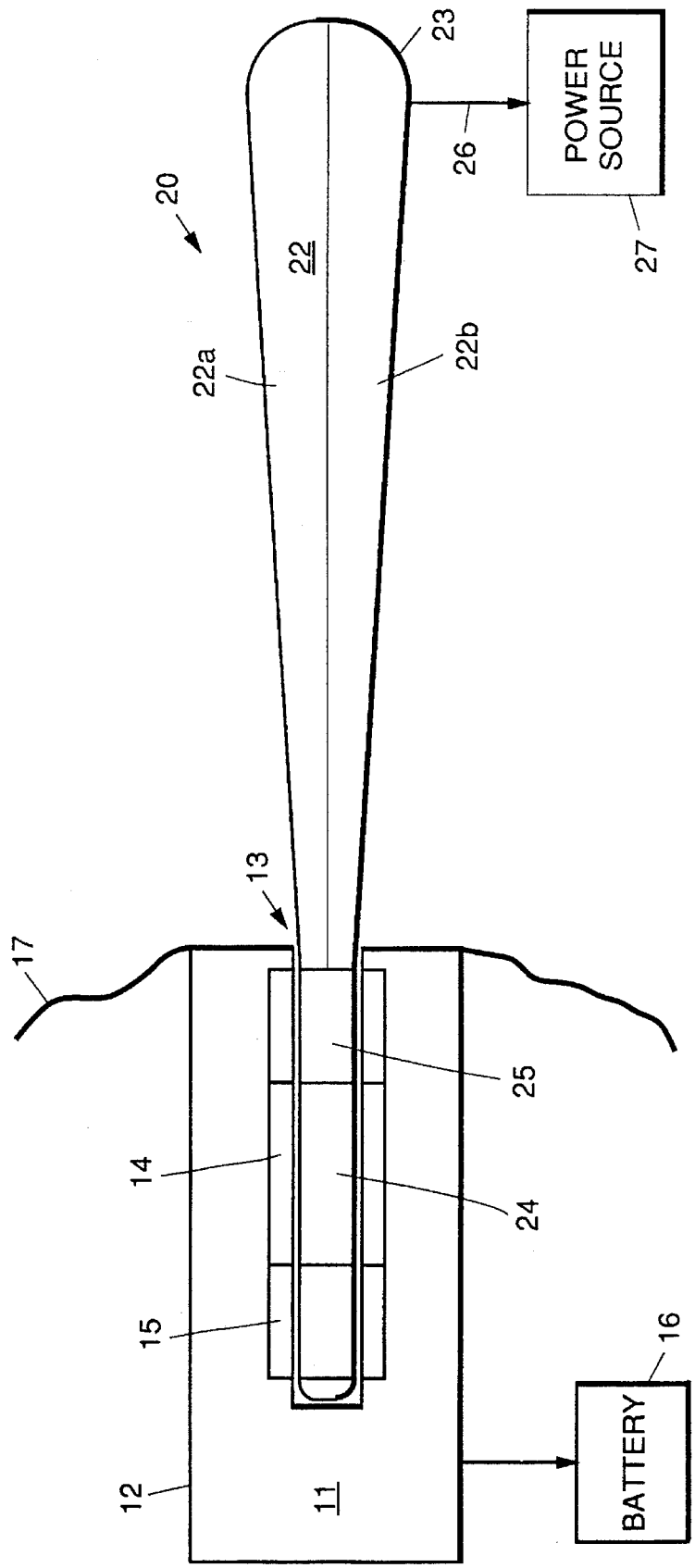
FIG. 1 is a partial cross sectional view of inductive charging apparatus that comprises an inductive charge probe in accordance with the principles of the present invention.

Referring to the drawing figures, FIG. 1 is a partial cross sectional view of inductive battery charging apparatus 10 employing an inductive charge probe 20 in accordance with the principles of the present invention. The inductive charge probe 20 is inserted into a charge port 11 disposed in an electric vehicle 17, when it is used to charge a propulsion battery 16 of the electric vehicle 17. The charge port 11 includes a housing 12 having an opening 13 into which the inductive charge probe 20 is inserted. The charge port 11 comprises two secondary core halves 14 and two sets of secondary windings 15 surrounding the core halves 14. The sets of secondary windings 15 are coupled to the battery 16 of the electric vehicle 17. The charge probe 20 is designed to be inserted into the opening 13 of the charge port 11 in order to couple power to the battery 15 from an external power source 27.

The inductive charge probe 20 is generally comprised of a plastic coupler housing 22 that has two mining coupler halves 22a, 22b that are configured to provide a handle 23. The inductive charge coupler 20 is comprised of a primary magnetic core 24 or "puck" 24, that is made of ferrite, for example. A primary winding 25 is disposed around the primary magnetic core 24. The mating halves 22a, 22b of the inductive charge probe 20 enclose the primary winding 25 and the primary magnetic core 24. The primary winding 25 is coupled by way of a power cable 26 to the external power source 27 for coupling power to the charge probe 20.

Figure 2:
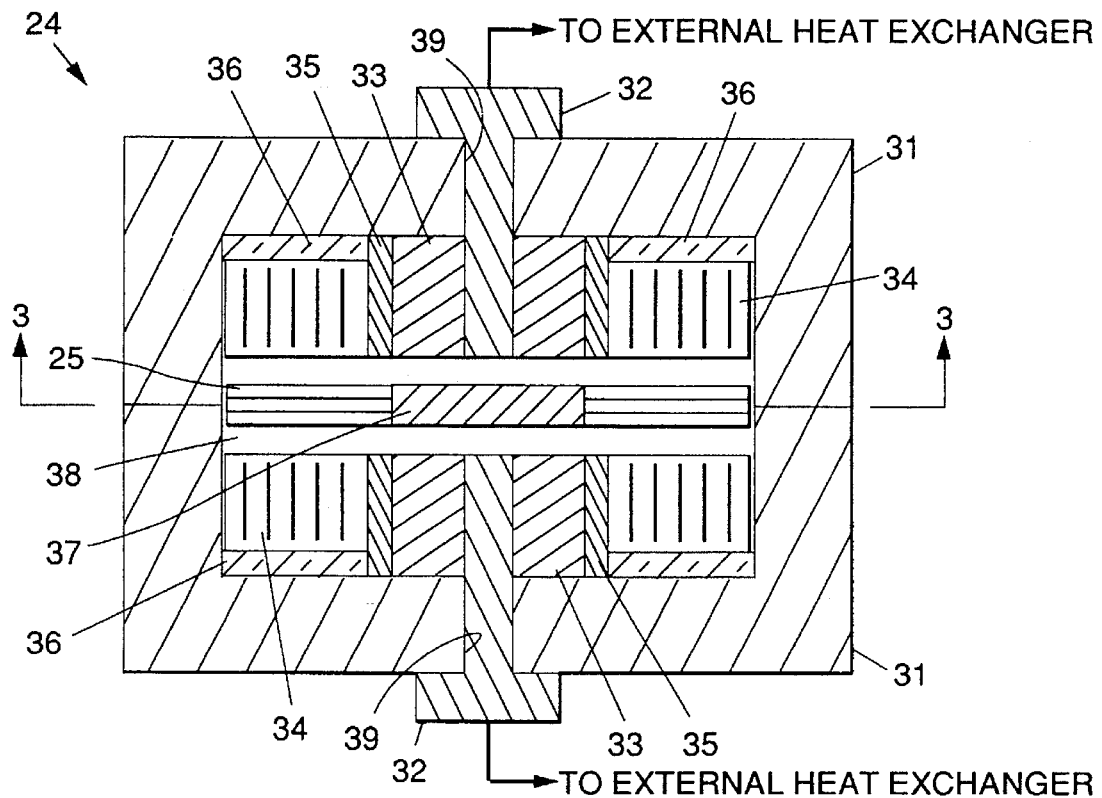
FIG. 2 is an enlarged cross sectional view of an inductive charge probe having a composite magnetic core in accordance with the principles of the present invention.
Figure 3:
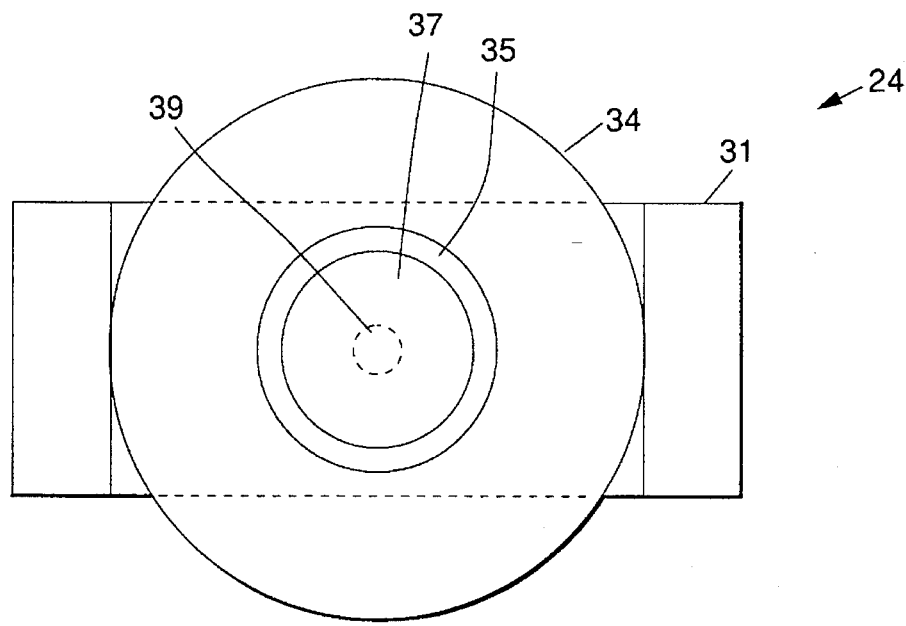
FIG. 3 is a top view of the charge probe of FIG. 2.

FIG. 2 is an enlarged cross sectional view of a composite primary magnetic core 24 in accordance with the principles of the present invention the may be employed in the inductive charge probe 20. The primary magnetic core 24 includes first and second magnetic core halves 31 comprising a high loss magnetic material that are disposed adjacent to each other and that contact each other at predetermined surfaces. The first and second magnetic core halves 31 are generally rectangular and have C-shaped cross sections. First and second thermal conducting members 32 are disposed through the first and second magnetic core halves 31 and a gap 38 is formed between adjacent proximal ends thereof. First and second magnetic center posts 33 comprising low loss magnetic material abut adjacent proximal inside surfaces of the first and second magnetic core halves 31. The first and second thermal conducting members 32 are respectively disposed through holes 39 in the magnetic core halves 31 and the magnetic center posts 33. Adjacent ends of the first and second magnetic center posts 33 are separated from each other by the gap 38. The first and second thermal conducting members 32 are secured in the holes 39 using thermally conductive bonding material.

First and second heat exchangers 34 are secured to peripheries of the first and second magnetic center posts 33 using thermally conductive bonding material 35, and adjacent surfaces thereof are separated from each other. The heat exchangers 34 are generally circular and extend beyond the edges of the magnetic core halves 31. First and second insulators 36 are disposed between the heat exchangers 34 and the respective magnetic core halves 31. A magnetic disk 37 comprising low loss magnetic (ferrite) material is disposed between the magnetic center posts 33 and the thermal conducting members 32. The magnetic disk 37 has substantially the same cross sectional shape as the first and second magnetic center posts 33. The primary winding 25 is disposed around the magnetic disk 37.

The present invention provides for a composite primary magnetic core 24 that thermally controls the temperature of the magnetic disk 37 in the inductively coupled charge probe 20. The present invention minimizes the temperature of the magnetic disk 37 while allowing greater power dissipation and temperature control of the primary magnetic core 24.

The present invention permits the design of very high power density, high power, high frequency probes 20 for inductively coupled battery charging apparatus 10. Te magnetic disk 37 that is embedded in the probe 20 is cooled to between touch temperatures of 60° to 70° C. This requires that the heat loss in the magnetic core 24, and the cooling thereof must be adequate to reach this temperature.

The present invention uses "localized dissipation and thermal control" to provide this temperature control of the probe 20. This temperature control is achieved by using very low loss ferrite material for the thermal conducting members 33 and magnetic disk 37 in the probe 20, and using a high loss ferrite material for the remaining portions of the magnetic core 24. The thermal conducting members 32 are thermally bonded to the air heat exchangers 34. The thermal conducting members 32 are inserted into the hole 39 through the magnetic core halves 31 and center posts 33. The hole 29 is filled with a thermally conductive material that conducts heat to the heat exchanger 34. The posts may be thermally bonded to the air heat exchangers 34 in a manner disclosed in the above-cited U.S. patent application Ser. No. 08/146,690, filed Nov. 2, 1993, entitled "Ducted Air-Cooled Secondary of Automotive Battery Charging Transformer", for example. Thus, the heat of the thermal conducting members 32 is minimized by conducting it away from the outer surfaces and inside surfaces of the probe 20. Heat dissipation in the magnetic disk 37 is minimized due to the use of low loss ferrite material, and is maintained at approximately the temperature of the magnetic center posts 33.

The present invention may be used in inductive battery charging apparatus employed for rapid, high rate charging of propulsion batteries of electric vehicles. Specifically, the present invention is adapted for use with an inductive charge coupler which, during charging, is inserted into a port on board an electric vehicle.

The present invention may be used in any transformer design but is specifically designed for use with inductive coupled transformer probes for charging the propulsion batteries of electric vehicles. The thermal limitations are particularly bad for electric vehicle induction coupled battery charging apparatus, such as where the inductive charge coupler is designed to be physically inserted into a secondary charge port disposed in the electric vehicle, since good thermal contact between the primary and secondary transformer cores is hard to achieve.

Thus there has been described a new and improved charge probe for use in inductive battery charging apparatus that comprises a composite magnetic core that thermally controls the temperature of a magnetic disk disposed in the charge probe. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. In an inductive charging apparatus for use in charging a battery, which apparatus comprises a charge probe that is insertable into a charge port that is coupled to the battery, and wherein the charge port comprises a housing, an opening into which the charge probe is inserted, and a secondary core surrounded by secondary windings, wherein said charge probe comprises:

a housing;

a primary magnetic core disposed in the housing that comprises:

first and second magnetic core halves comprising high loss magnetic material that are disposed adjacent to each other and that contact each other at predetermined surfaces;

first and second magnetic center posts comprising low loss magnetic material disposed adjacent the first and second magnetic core halves;

first and second thermal conducting members disposed through the first and second magnetic core halves and the first and second magnetic center posts and wherein a gap is formed between adjacent proximal ends thereof;

first and second heat exchangers thermally secured to peripheries of the first and second magnetic center posts, and wherein adjacent surfaces thereof are separated from each other:

first and second insulators disposed between the first and second heat exchangers and the first and second magnetic core halves;

a magnetic disk comprising low loss magnetic material disposed in the gap between the first and second magnetic center posts and the thermally conducting members; and a primary winding disposed around the magnetic disk.

2. The charge probe of claim 1 wherein the first and second heat exchangers are thermally secured to the peripheries of the first and second magnetic center posts by means of heat conducting adhesive.

3. The charge probe of claim 1 wherein the first and second magnetic core halves comprise a high loss ferrite material.

4. The charge probe of claim 1 wherein the first and second magnetic center posts comprise low loss ferrite material.

5. The charge probe of claim 1 wherein the magnetic disk comprises a low loss ferrite material.

6. The charge probe of claim 1 wherein the magnetic disk has substantially the same cross sectional shape as the first and second magnetic center posts.

7. The charge probe of claim 1 wherein the first and second magnetic core halves are generally rectangular and have C-shaped cross sections.

\* \* \* \* \*